United States Patent [19]

Hahn et al.

[11] Patent Number: 4,990,539
[45] Date of Patent: Feb. 5, 1991

[54] PREPARATION OF STYRENE POLYMER FOAM PARTICLES

[75] Inventors: Klaus Hahn, Kirchheim; Uwe Guhr, Gruenstadt; Roland Gellert; Wolf-Dieter Back, both of Neustadt, all of Fed. Rep. of Germany

[73] Assignee: BASF Aktiengesellschaft, Ludwigshafen, Fed. Rep. of Germany

[21] Appl. No.: 437,662

[22] Filed: Nov. 17, 1989

[30] Foreign Application Priority Data

Dec. 16, 1988 [DE] Fed. Rep. of Germany ....... 3842305

[51] Int. Cl.$^5$ ................................................. C08J 9/12
[52] U.S. Cl. .......................................... 521/60; 264/25; 521/56; 521/58; 521/59; 521/915
[58] Field of Search ...................... 264/25; 521/56, 58, 521/59, 60, 915

[56] References Cited

U.S. PATENT DOCUMENTS

| | | | |
|---|---|---|---|
| 3,253,064 | 5/1966 | Buonaiuto | 521/51 |
| 4,035,216 | 7/1977 | Immel | 264/27 |
| 4,173,608 | 11/1979 | Soulier | 264/26 |
| 4,193,499 | 3/1980 | Lookholder | 264/51 |
| 4,351,884 | 9/1982 | Robertson | 428/422.8 |
| 4,740,530 | 4/1988 | Pip | 521/146 |
| 4,765,934 | 8/1988 | Nazar et al. | 521/58 |

FOREIGN PATENT DOCUMENTS 3532347 3/1987 Fed. Rep. of Germany .
922547 4/1963 United Kingdom .

Primary Examiner—Morton Foelak
Attorney, Agent, or Firm—Oblon, Spivak, McClelland, Maier & Neustadt

[57] ABSTRACT

Styrene polymer foam particles of from 10 to 30 kg/m$^3$ in density are obtained by foaming styrene polymers which, per kg, contain from 0.7 to 3 moles of blowing agent mixture composed of from 60 to 90 mol % of water and from 10 to 40 mol % of the C$_4$- or C$_5$-hydrocarbon with the aid of microwaves.

2 Claims, No Drawings

PREPARATION OF STYRENE POLYMER FOAM PARTICLES

The present invention relates to the preparation of foam particles from 10 to 30 kg/m$^3$ in density from styrene polymers by a novel, environment friendly process using only a small amount of an organic blowing agent.

The preparation of foam particles from styrene polymers is known. The starting point in the art is an expandable styrene polymer which contains a C$_4$- or C$_5$-hydrocarbon blowing agent and is foamed up by heating with steam. Expandable styrene polymers are customarily prepared by suspension polymerization of styrene in the presence of the blowing agent. The foam particles are subsequently further expanded by renewed heating in a perforated pressure resistant mold with superheated steam, when they become fused together to form a molded foam.

It is an object of the present invention to reduce the amount of organic blowing agent in the production of styrene polymer foam particles and thereby to cut environmental pollution.

We have found that this object is achieved by replacing some of the organic blowing agent by water and by foaming with the aid of microwaves.

The present invention accordingly provides a process for preparing styrene polymer foam particles from 10 to 30 kg/m$^3$ in density, which comprises foaming styrene polymer particles which, per kg, contain from 0.7 to 3 moles of a blowing agent mixture composed of from 60 to 90 mol % of water and from 10 to 40 mol % of one or more than one C$_4$- or C$_5$-hydrocarbon with the aid of microwaves.

DE-A-3,532,347 discloses the preparation of foamed plastics which contain hydroxyl, thiol, alkylamino, amino or carboxyl groups with the aid of microwaves. The blowing agents used are chlorofluorocarbons.

GB-B-922,547 discloses the foaming of expandable styrene polymers which contain 10% by weight of toluene sulfonamides or tetrachlorobiphenyl and of chlorinated polystyrene having a chlorine content of 25% by weight with the aid of microwaves. The blowing agent used is petroleum ether.

Expandable styrene polymers in which the organic blowing agent has been wholly or partly replaced by water show completely unsatisfactory foaming characteristics if conventionally foamed with the aid of steam or hot air. Surprisingly, foaming with the aid of microwaves produces a significantly lower density. This is very surprising to a skilled worker, since, if organic blowing agents are used alone, foaming with the aid of steam, hot air or microwaves produces in each case foam particles of approximately the same density.

Styrene polymers for the purposes of the present invention are polystyrene and copolymers of styrene with other α,β-olefinically unsaturated compounds which contain not less than 50 parts by weight of styrene as copolymerized units. Suitable copolymerization components are for example α-methylstyrene, ring-halogenated styrenes, ring-alkylated styrenes, acrylonitrile, esters of acrylic or methacrylic acid with alcohols of from 1 to 8 carbon atoms, N-vinyl compounds, such as vinylcarbazole, maleic anhydride or even small amounts of compounds which contain two polymerizable double bonds, such as butadiene, divinylbenzene or butanediol diacrylate. It is also possible to use copolymers and graft copolymers of from 40 to 90% by weight of polystyrene and from 10 to 60% by weight of polyethylene or polypropylene.

The styrene polymers contain, per kg, from 0.7 to 3 moles of a blowing agent mixture composed of from 60 to 90 mol % of water, present in very finely divided form, and from 10 to 40 mol % of a C$_4$- or C$_5$-carbon, such as butane, n-pentane, isopentane and/or neopentane, present in dissolved form. In general, the blowing agent mixture is composed of from 1 to 3% by weight of water and from 1 to 3.5% by weight of pentane. The water is dispersed in the styrene polymer by the presence of an extremely small amount of a customary wetting agent. A suitable wetting agent is for example an ethoxylated tallow fat alcohol. The effect of the wetting agent is to prevent the exudation of water during the storage of the expandable styrene polymer. The wetting agent is in general used in an amount of from 0.001 to 0.1% by weight, based on the styrene polymer.

The expandable styrene polymer particles can be present in bead form, in the form of cylindrical granules or in the form of crumbs. The particles advantageously have a diameter of from 0.1 to 6 mm, in particular from 0.4 to 3 mm. They mainly contain further additives in the form of customary dyes, fillers, stabilizers, flame retardants, synergists, etc. in customary amounts.

They are prepared in a conventional manner, advantageously by suspension polymerization of styrene in an aqueous phase in the presence of both the blowing agent and the wetting agent. After the polymerization has ended, the beads are separated from the aqueous phase, washed and briefly dried to remove adherent surface water.

To prepare the foam particles, the expandable styrene polymer particles are foamed up with the aid of microwaves. The water present in a very finely dispersed form in the interior of the beads absorbs the microwave radiation and becomes vaporized, and the simultaneous vaporization of the hydrocarbon and the softening of the styrene polymer causes the beads to expand. The foam particles obtained are from 10 to 30 kg/m$^3$ in density. After settling down, they can be further expanded with the aid of steam or hot air and welded together in the conventional manner in pressure resistant perforated molds to give molded foam products.

In the Examples, parts are by weight.

EXAMPLES 1 to 6

In a pressure resistant stirred kettle, a mixture of 150 parts of water, 0.1 part of sodium pyrophosphate, 100 parts of styrene, pentane and wetting agent (ethoxylated tallow fat alcohol) in varying weights, based on styrene, 0.15 part of tert-butyl benzoate and 0.45 part of benzoyl peroxide were heated to 90° C. with stirring. After 2 hours at 90° C., 4 parts of a 10 % aqueous solution of polyvinylpyrrolidone were added as suspension stabilizer, and the mixture was stirred at 90° C. for a further 2 hours, than at 100° C. for 2 hours and finally at 120° C. for 2 hours.

The resulting polymer in bead form having an average particle diameter of about 1 mm was separated from the aqueous phase, washed and briefly dried with air at from 40° to 70° C. to remove adherent surface water. Thereafter the water content (internal water) of the beads was determined.

The beads were then irradiated in a conventional microwave cooker (power rating 650 W) with microwaves for 6 minutes, and they expand. For comparison, the beads were foamed for 6 minutes with a steam flow. The results are summarized in the table.

TABLE

| Example | Pentane | Wetting agent | Internal water | Density after foaming [kg/m$^3$] | |
|---|---|---|---|---|---|
| | | | | with microwaves | with steam flow |
| 1 (comparison) | — | 0.005 | 0.5 | 415 | 800 |
| 2 (comparison) | — | 0.010 | 2.1 | 350 | 790 |
| 3 | 2.3 | 0.020 | 2.4 | 29 | 130 |
| 4 | 3.2 | 0.010 | 2.3 | 15 | 90 |
| 5 (comparison) | 2.3 | — | <0.1 | 200 | 135 |
| 6 (comparison) | 3.2 | — | <0.1 | 150 | 92 |

We claim:

1. A process for preparing styrene polymer foam particles from 10 to 30 kg/m$^3$ in density, which comprises expanding styrene polymer particles which, per kg, contain from 0.7 to 3 moles of a blowing agent mixture composed of 60 to 90 mol % of water and 10 to 40 mol % of one or more than one $C_4$- or $C_5$-hydrocarbon with the aid of microwaves.

2. A process as claimed in claim 1, wherein the styrene polymer particles contain from 0.001 to 0.1% by weight of a wetting agent as a dispersant for the water.